US012136406B2

(12) United States Patent
Edwards et al.

(10) Patent No.: US 12,136,406 B2
(45) Date of Patent: Nov. 5, 2024

(54) AUTOMATED CREATION OF VIRTUAL ENSEMBLES

(71) Applicant: Virtual Music Ensemble Technologies, LLC, Ann Arbor, MI (US)

(72) Inventors: Bryan B. Edwards, La Jolla, CA (US); Brian S. Kim, Carlsbad, CA (US); Phillip D. Sylvester, West Bloomfield, MI (US)

(73) Assignee: Virtual Music Ensemble Technologies, LLC, Ann Arbor, MI (US)

( * ) Notice: Subject to any disclaimer, the term of this patent is extended or adjusted under 35 U.S.C. 154(b) by 530 days.

(21) Appl. No.: 17/388,821

(22) Filed: Jul. 29, 2021

(65) Prior Publication Data

US 2022/0036868 A1 Feb. 3, 2022

Related U.S. Application Data

(60) Provisional application No. 63/059,612, filed on Jul. 31, 2020.

(51) Int. Cl.
*G10H 1/36* (2006.01)
*G10H 1/00* (2006.01)

(52) U.S. Cl.
CPC .......... *G10H 1/365* (2013.01); *G10H 1/0083* (2013.01); *G10H 2240/201* (2013.01); *G10H 2240/281* (2013.01); *G10H 2250/051* (2013.01)

(58) Field of Classification Search
CPC .......... G10H 1/0025; G10H 2240/175; G10H 2210/331; G10H 2240/251;
(Continued)

(56) References Cited

U.S. PATENT DOCUMENTS 9,412,390 B1 * 8/2016 Chaudhary .......... G10L 21/00
2008/0053286 A1 * 3/2008 Teicher .......... G10H 1/0083 84/2

(Continued)

FOREIGN PATENT DOCUMENTS

GB 2610801 A * 3/2023 .......... G10H 1/0058

*Primary Examiner* — Marlon T Fletcher
(74) *Attorney, Agent, or Firm* — Quinn IP Law

(57) ABSTRACT

A method creates a virtual ensemble file by receiving, at a central assembler node, recorded performance files from a recording node(s). The recording nodes generate a respective one of the performance files concurrently with playing a backing track and/or nodal metronome signal. Each performance file includes audio and/or visual data. The assembler node generates the ensemble file as a digital output file. Another method creates the ensemble file by receiving input signals inclusive of the backing track and/or metronome signal at the recording node(s), and generating the performance files at the recording node(s) concurrently with playing the backing track and/or metronome signal. The performance files are transmitted to the assembler node. A computer-readable medium or media has instructions for creating the ensemble file, with execution causing a first node to generate the performance files, and a second node to receive the same and generate the ensemble file.

20 Claims, 7 Drawing Sheets

(58) Field of Classification Search

CPC ....... G10H 2240/305; G10H 2250/311; G10H 2210/111; G10H 2210/125; G10H 2220/101; G10H 2220/091; G10H 2210/105; G10H 2240/075; G10H 1/361; G10H 2210/071; G10H 2240/325; G10H 1/0041; G10H 2240/141; G10H 1/365; G10H 2210/391; G10H 2240/125; G10H 1/0033; G10H 2210/005; G10H 1/36; G10H 2210/086; G10H 2240/016; G10H 2240/046

See application file for complete search history.

(56) References Cited

U.S. PATENT DOCUMENTS

| | | | | |
|---|---|---|---|---|
| 2009/0027338 | A1* | 1/2009 | Weinberg | G10H 1/0083 345/157 |
| 2016/0182855 | A1* | 6/2016 | Caligor | H04N 7/15 348/14.06 |
| 2016/0358595 | A1* | 12/2016 | Sung | G11B 27/34 |
| 2017/0123755 | A1* | 5/2017 | Hersh | G10H 1/366 |
| 2017/0124999 | A1* | 5/2017 | Hersh | H04N 21/43615 |
| 2018/0288467 | A1* | 10/2018 | Holmberg | H04N 5/265 |
| 2018/0374462 | A1* | 12/2018 | Steinwedel | G10H 1/366 |
| 2019/0266987 | A1* | 8/2019 | Yang | G10L 21/013 |
| 2019/0355336 | A1* | 11/2019 | Steinwedel | H04L 12/1813 |
| 2019/0355337 | A1* | 11/2019 | Steinwedel | H04N 21/42203 |
| 2020/0058279 | A1* | 2/2020 | Garrison | G10H 1/0066 |
| 2021/0055905 | A1* | 2/2021 | Moldover | H04N 21/41407 |
| 2022/0036868 | A1* | 2/2022 | Edwards | G10H 1/0041 |
| 2023/0065117 | A1* | 3/2023 | Gardner | G10H 1/0058 |
| 2023/0410780 | A1* | 12/2023 | Salazar | G10L 21/013 |

* cited by examiner

AUTOMATED CREATION OF VIRTUAL ENSEMBLES

CROSS-REFERENCE TO RELATED PATENT APPLICATION(S)

This patent application claims the benefit of and priority to U.S. Provisional Patent Application Ser. No. 63/059,612, filed on Jul. 31, 2020, the contents of which are hereby incorporated by reference.

INTRODUCTION

The present disclosure relates to the field of musical entertainment software and hardware implementations thereof. Specifically, the present disclosure relates to systems and methods for creating virtual ensembles of musical, dance, theatrical, or other performances or rehearsals thereof by a group of performing artists ("performers") who are physically separated from each other or otherwise unable to perform together in person as a live ensemble.

SUMMARY

The present disclosure is directed toward solving practical problems associated with videoconferencing and video editing applications in the realm of constructing a virtual ensemble. Performers of virtual ensembles tend to rely on commercially-available videoconferencing applications, possibly assisted by post-performance video editing techniques. While videoconferencing has generally proved effective for conducting business meetings or other multi-party conversations, signal latency and challenges related to factors such as audio balancing and network connection stability make videoconferencing suboptimal in situations in which precise timing, synchronization, and audio quality are critical.

For instance, variations in microphone configuration and placement, background noise levels, etc., may result in a performer of given performance piece, e.g., a song, dance, theater production, symphony, sonata, opera, cadenza, concerto, movement, opus, aria, etc., being too loud or, at the other extreme, practically inaudible relative to other performers of the performance piece. It is not feasible to fix issues of asynchronization, imbalanced audio, and other imperfections arising during a live videoconferencing performance. Likewise, post-performance editing of timing, synchronization, and audio and/or visual balancing is generally labor intensive and may require specialized skills. The solutions described herein are therefore intended to automatically synchronize multiple performance recordings while enabling rapid balancing and other audio and/or video adjustments prior to or during final assembly of a virtual ensemble. Additionally, the present solutions are computationally efficient relative to conventional methods, some of which are summarized herein.

As described in detail herein, creation of a virtual ensemble of performing artists ("performers") uses a distributed recording array of one or more recording nodes ("distributed recorder") and at least one recording assembler ("central assembly node"), the latter of which may be a standalone or cloud-based host device/server or functionally included within at least one of the one or more recording nodes of the distributed recorder in different embodiments. The distributed recorder may include one or more of the recording nodes, e.g., at least ten recording nodes or twenty-five or more recording nodes in different embodiments, with each recording node possibly corresponding to a client computer device and/or related software of respective one of the performers. Computationally-intensive process steps may be hosted by the central assembly node, thereby allowing for rapid assembly of large numbers of individual performance recordings into a virtual ensemble.

According to a representative embodiment, a method for creating a virtual ensemble file includes receiving, at a central assembler node, a plurality of recorded performance files from one or more recording nodes. The recorded performance files each correspond to a performance piece. The one or more recording nodes are configured to generate a respective one of the plurality of the recorded performance files concurrently with playing at least one of a backing track or a nodal metronome signal. Additionally, each of the recorded performance files respectively includes at least one of audio data or visual data, and the plurality of the recorded performance files collectively has a standardized or standardizable performance length.

The method in this particular embodiment includes generating, at the central assembler node, the virtual ensemble file as a digital output file. The virtual ensemble file includes at least one of (i) mixed audio data which includes the audio data, or (ii) mixed video data which includes the video data.

A method for creating the virtual ensemble file in another embodiment includes

- receiving input signals inclusive of at least one of a backing track or a nodal metronome signal at one or more recording nodes, and generating, at the one or more recording nodes, a plurality of recorded performance files concurrently with playing the at least one of the backing track or the nodal metronome signal at the one or more recording nodes. The plurality of recorded performance files correspond to a performance piece. The plurality of recorded performance files have a standardized or standardizable performance length, as noted above, and each recorded performance file respectively includes at least one of audio data or visual data.

The method according to this embodiment includes transmitting, from the one or more recording nodes, the plurality of recorded performance files to a central assembler node configured to generate the virtual ensemble file as a digital output file. The virtual ensemble file includes at least one of (i) mixed audio data which includes the audio data, or (ii) mixed video data which includes the video data.

An aspect of the disclosure includes one or more computer-readable media. Instructions are stored or recorded on the computer-readable media for creating a virtual ensemble file. Execution of the instructions causes a first node to generate a plurality of recorded performance files corresponding to a performance of a performance piece. This occurs concurrently with playing at least one of a nodal metronome signal or a backing track. The plurality of recorded performance files has a standardized or standardizable performance length and includes at least one of audio data or visual data. Execution of the instructions also causes a second node to receive the plurality of the recorded performance files, and, in response, to generate the virtual ensemble file as a digital output file. As summarized above, the virtual ensemble file includes at least one of (i) mixed audio data which includes the audio data, or (ii) mixed video data which includes the video data.

These and other features, advantages, and objects of the present disclosure will be further understood and appreciated by those skilled in the art by reference to the following specification, claims, and appended drawings. The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings.

Figure 1:
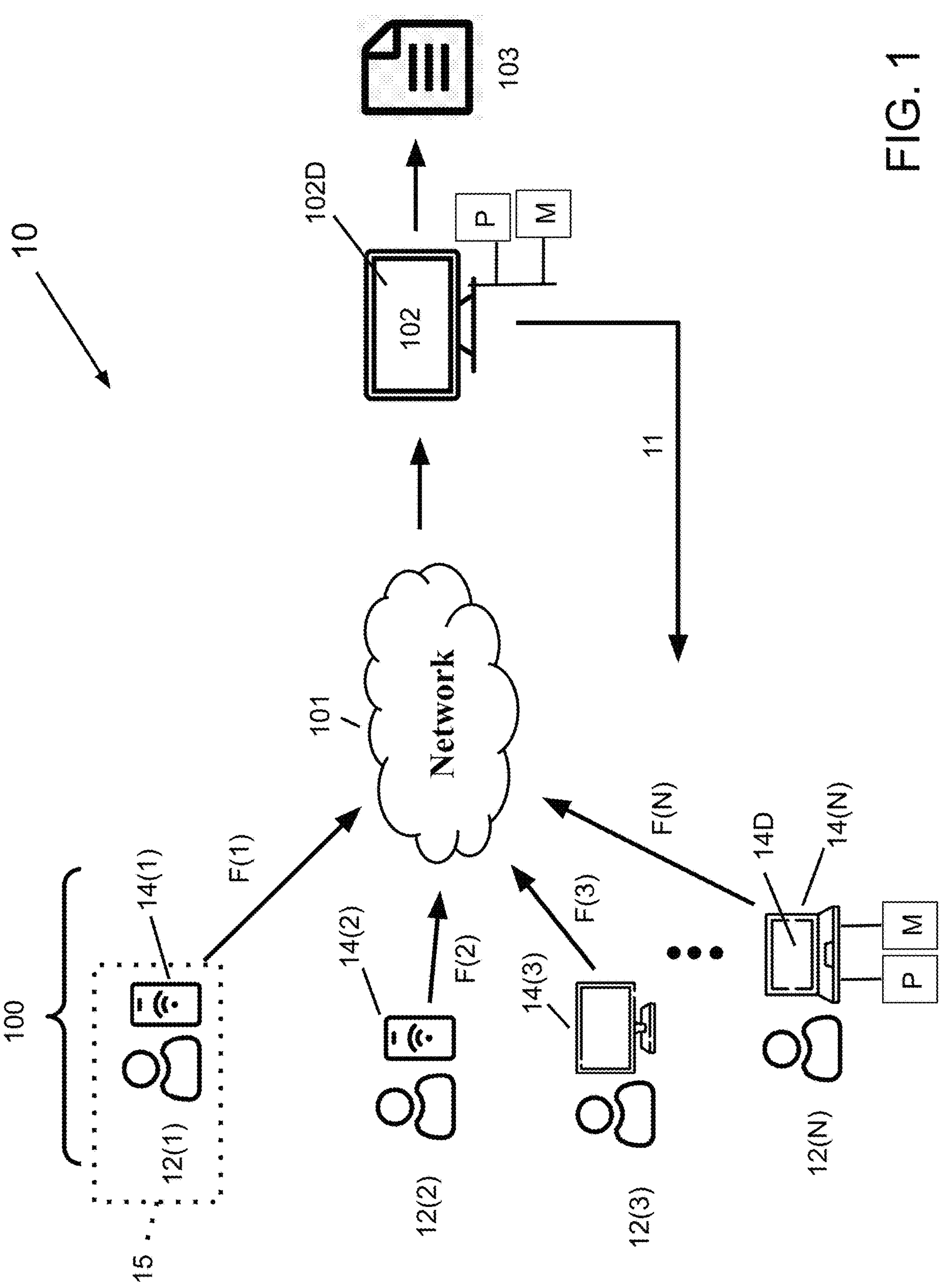
FIGS. 1 and 2 illustrate exemplary embodiments of a system for constructing virtual ensembles in accordance with the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

DETAILED DESCRIPTION

Various disclosed orientations and step sequences described below may be envisioned, except where expressly specified to the contrary. Also for purposes of the present detailed description, words of approximation such as "about," "almost," "substantially," "approximately," and the like, may be used herein in the sense of "at, near, or nearly at," or "within 3-5% of," or "within acceptable manufacturing tolerances," or any logical combination thereof. Specific devices and processes illustrated in the attached drawings, and described in the following specification, are exemplary embodiments of the inventive concepts defined in the appended claims. Hence, specific dimensions and other physical characteristics relating to the embodiments disclosed herein are not to be considered as limiting, unless the claims expressly state otherwise.

As understood in the art, an ensemble is a group of musicians, actors, dancers, and/or other performing artists ("performers") who collectively perform an entertainment or performance piece as described herein, whether as a polished performance or as a practice, classroom effort, or rehearsal. Ideally, a collaborative performance is performed in real-time before an audience or in a live environment such as a stadium, arena, or theater. However, at times the performers may be physically separated and/or unable to perform together in person, in which case tools of the types described herein are needed to facilitate collaboration in a digital environment. Audio and/or video media comprised of recordings of one or more performers each performing a common performance piece, wherein the recordings of the performances of the common performance piece are digitally synchronized is described hereinafter as a "virtual ensemble", with the present teachings facilitating construction of virtual ensemble file as set forth below with reference to the drawings.

Referring now to FIG. 1, a system 10 as set forth herein includes a distributed recorder 100 and a central assembler node 102. The distributed recorder 100 in turn includes a distributed plurality of recording nodes 15, with the term "node" as used herein possibly including distributed or networked hardware and/or associated computer-readable instructions or software for implementing the present teachings. A more detailed definition of node is provided below, with the term "node" employed hereinafter for illustrative simplicity and consistency. The number of recording nodes 15 may be represented as an integer value (N), with N representing the number of performers or, more accurately, the number of performances in a given performance piece. For instance, each performer 12 may perform a segment or part of the performance piece, or as few as one performer 12 may perform all segments or parts of the performance piece at different times.

Each recording node 15 may include a client computer device 14(1), 14(2), 14(3), . . . , 14(N) each having a corresponding display screen 14D (shown at node 14N for simplicity) operated by a respective performer 12(1), 12(2), 12(3), . . . , 12(N). An ensemble may have as few as one performer, with $N \geq 10$ or $N \geq 25$ in other embodiments. In other words, benefits of the arrangement contemplated herein are, for example, not being bandwidth-limited or processing power-limited to several performers 12. Within the configuration of the system 10 shown in FIG. 1, each respective one of the various client computer devices 14(1), . . . , 14(N) is communicatively coupled to the central assembler node 102 over a suitable high-speed network connection 101, e.g., a cable, fiber, satellite, or other application-suitable network connection 101, with the central assembler node 102 ultimately generating a Virtual Ensemble File ("VEF") 103 as a digital output.

With respect to the distributed recorder 100, this portion of the system 10 provides individual video capture and/or audio recording functionality to each respective performer 12(1), . . . , 12(N). Hardware and software aspects of the constituent distributed recording nodes 15 may exist as a software application ("app") or as a website service accessed by the individual client computer devices 14(1), . . . , 14(N), e.g., a smartphone, laptop, tablet, desktop computer, etc. Once accessed, the central assembler node 102 in certain embodiments may transmit input signals (arrow 11) as described below to each recording node 15, with the input signals (arrow 11) including any or all of performance parameters, the parameters possibly being inclusive of or forming a basis for a nodal metronome signal, a backing track, and a start cue of a performance piece to be performed by the various performers 12 within each distributed recording node 15. Alternatively, any one of the recording nodes 15 may function as the central assembler node 102, itself having a display screen 102D. A conductor, director, or other designated authority for the performance piece could simply instruct the various performers 12 to initiate the above-noted software app or related functions. In the different embodiments of FIGS. 1 and 2, the central assembler node 102 is configured to assemble the performance recordings, i.e., F(1), F(2), F(3), . . . , F(N) into the virtual ensemble file 103 as a digital output file.

Figure 2:
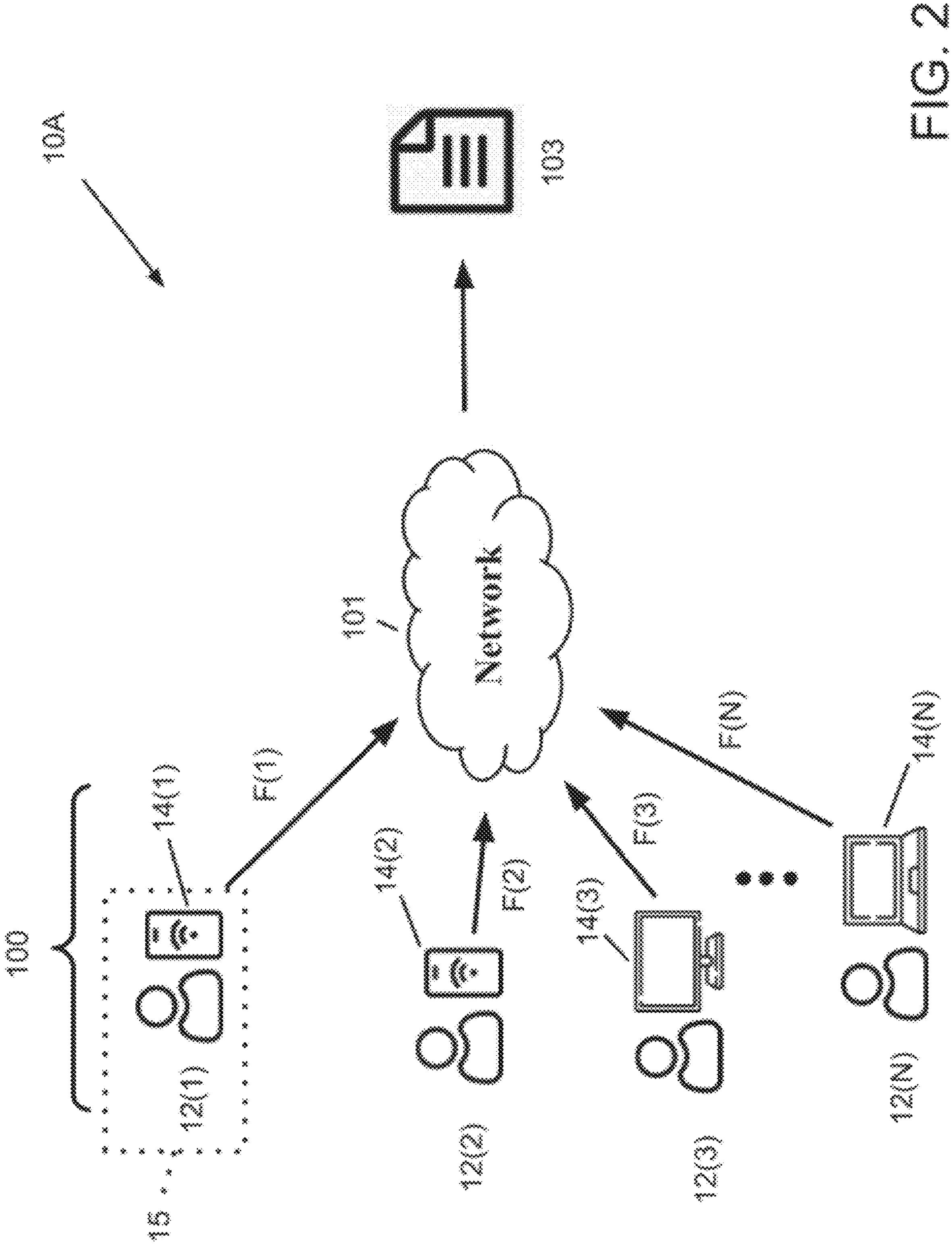

The central assembler node 102 of FIG. 1 may be embodied as the above-noted app on any type of computer device, e.g., a centralized server or host computer, wearable device, or as a distributed cloud-based server or server cluster programmed in software and equipped in hardware to perform the process steps detailed below, for instance having one or more processors or microprocessors (P), volatile and non-volatile memory (M) including, as explained below, tangible, non-transitory medium or media, input/output circuitry, high-speed clock, etc. While shown as a single device for illustrative clarity and simplicity, those of ordinary skill in the art will appreciate that the functions of the central assembler node 102 may be distributed so as to reside in different networked locations. That is, the central assembler node 102 may be hosted on one or more relatively high-power computers as shown in FIG. 1 and/or over a network connection 101 or cloud computing as shown in FIG. 2, with the latter possibly breaking functions of the central assembler node 102 into application files that are then executed by the various client computer devices 14(1), . . . , 14(N). In other words, the term "node" as it relates to the central assembler node 102 may constitute multiple nodes 102, with some or all of the nodes 102 possibly residing aboard one or more of the client computer devices 14(1), . . . , 14(N), as with the exemplary embodiment of the system 10A in FIG. 2.

While the term "central" is used, the central assembler node is not necessarily central in its location physically, geographically, from a network perspective, or otherwise. For example, as will be discussed further in later paragraphs, the central assembler node may be hosted on a recorder node. Also, while the term "assembler" is used, the central assembler node may do more than simply assemble recordings into a virtual ensemble. For example, as will be discussed further in later paragraphs, the central assembler node may transmit at least one of performance parameters, a backing track, or a nodal metronome signal to the recording nodes. Other functions of the central assembler node, beyond merely assembling recordings into a virtual ensemble, will also be discussed.

Figure 3:
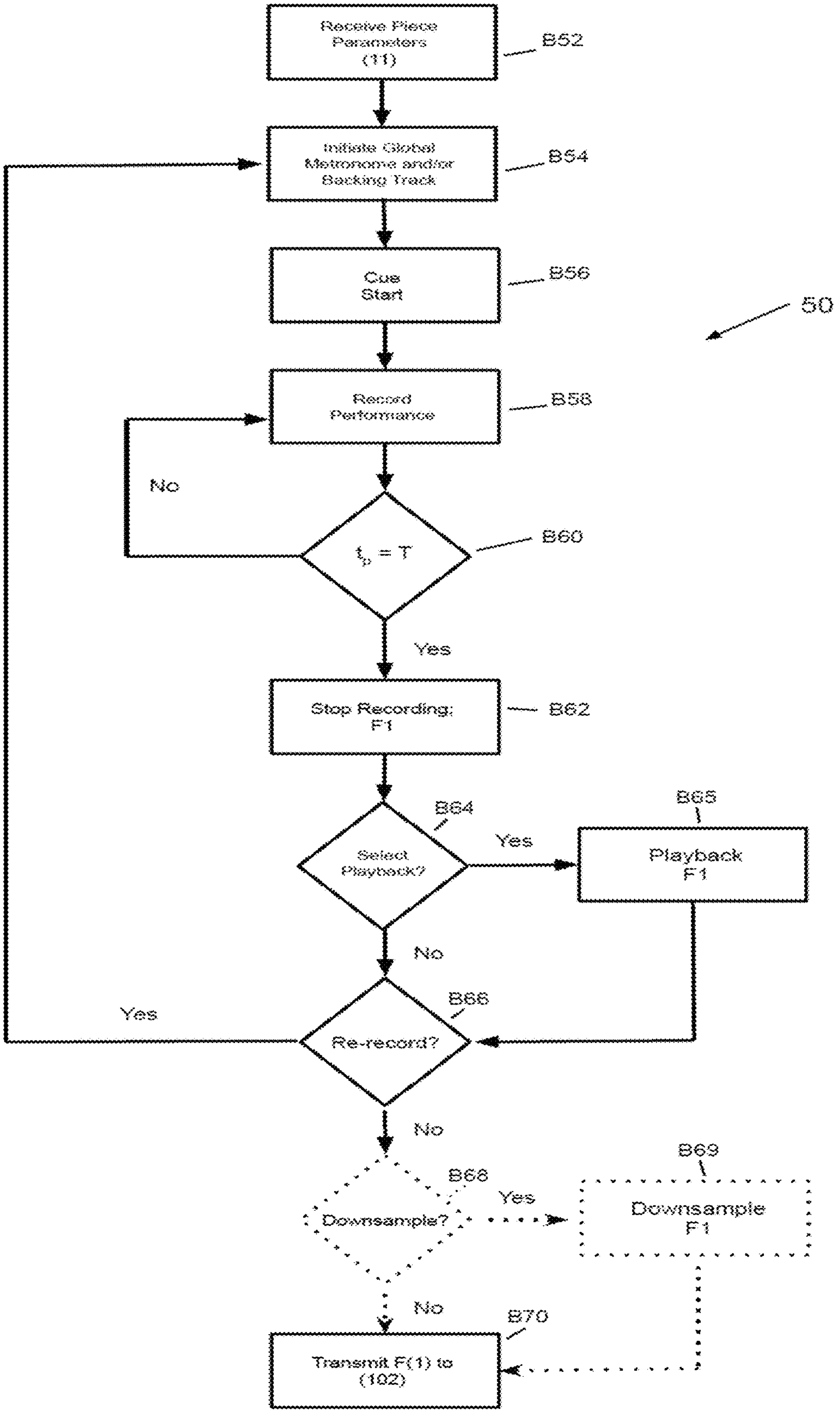
FIGS. 3 and 4 are schematic flow charts together describing a method for constructing a virtual ensemble using the representative system of FIG. 1 or 2.

Referring to FIG. 3, a method 50 is described for use in creating a portion of a virtual ensemble, for ultimate incorporation into the virtual ensemble file 103 depicted schematically in FIGS. 1 and 2. Method 50 describes the recording of a performance by one performer 12. Thus, the method 50 may be repeated for each recording, whether this entails one performer 12 making several recordings or several performers 12 each making one or more recordings.

In an exemplary embodiment, in order to initiate optional embodiments of the method 50, a performer 12 out of the population of performers 12(1), . . . , 12(N) may access a corresponding client computer device 14(1), . . . , 14(N) and open an application or web site. In certain implementations, the method 50 includes providing input signals (arrow 11 of FIGS. 1 and 2) inclusive of the set of performance parameters, a nodal metronome signal, a backing track, and/or a start cue to each of a plurality of recording nodes 15 of the distributed recorder 100. The central assembler node 102 may provide the input signals (arrow 11) in some embodiments, or the input signals (arrow 11) may be provided by embedded/distributed variations of the central assembler node 102 in other embodiments. Still other embodiments may forego use of the input signals (arrow 11), e.g., in favor of a director or conductor verbally queuing the performers 12 to open their apps and commence recording in accordance with the method 50.

As noted above, the recording nodes 15 may include a respective client computer device 14 and/or associated software configured to record one or more performances of a respective performer 12 in response to the input signals (arrow 11). This occurs concurrently with playing of the backing track and/or the nodal metronome signal on the respective client computer device 14, which in turn occurs in the same manner at each client computer device 14, albeit at possibly different times based on when a given recording commences. Each client computer device 14 then outputs a respective recorded performance file, e.g., F(N), having a common (standardized) performance length (T) in some embodiments, or eventually truncated/elongated thereto (standardizable). As part of the method 50, the central assembler node 102 may receive a respective recorded performance file from each respective one of the recording nodes 15, and in response, may generate the virtual ensemble file 103 as a digital output file. This may entail filtering and/or mixing the recorded performance files from each performer 12 via the central assembler node 102, possibly with manual input.

At block B52 of FIG. 3, the client computer device 14 may receive the input signals (arrow 11) from the central assembler node 102, with the input signals (arrow 11) including the performance parameters, the backing track and/or the nodal metronome signal, and a possible start cue as noted above. Alternatively, the performance parameters may be provided by another one or more of the client computer devices 14(1), . . . , 14(N) acting as a host device for performing certain functions of the central assembler node 102, such as when a particular performer, band leader, conductor, director, choreographer, etc., asserts creative control of the performance piece using a corresponding client computer device 14.

For a given piece or piece section, the performance parameters in a non-limiting embodiment in which the piece is a representative musical number, may include a musical score of the piece, a full audio recording of the piece, a piece name and/or composer name, a length in number of measures or time duration, a tempo, custom notes, a location of the piece section and/or repeats relative to the piece, a time signature, beats per measure, a type and location of musical dynamics, e.g., forte, mezzo forte, piano, etc., key signatures, rests, second endings, fermatas, crescendos and decrescendos, and/or possibly other parameters. Such musical parameters may include pitch, duration, dynamics, tempo, timbre, texture, and structure in the piece or piece segments.

In other embodiments, the central assembler node 102 may prompt user input for any of the performance parameters discussed above. An input length of the piece may be modified by input repeats, possibly in real-time, to determine a new length of the piece. The distributed recorder 100 may also have functionality for the performer 12 to end a given recording at a desired time, also in real-time. The distributed recorder 100 may have programmed functionality to pause recording and restart at a desired time, with cue-in. The method 50 proceeds to block B54, for a given performer 12, when the performer 12 has received the performance parameters.

The backing track and/or nodal metronome signal may be created or modified based upon at least one of the performance parameters. For example, a user may input a tempo of a piece, a number of beats per measure in the piece, and a total number of measures in the piece. A nodal metronome signal may then be generated for the user to perform with during recording. In another example, a user may input a tempo that is a faster tempo than a backing track of the piece. The backing track may be modified, increasing its tempo to the tempo input by the user for the user to perform with during recording.

At block B54, the central assembler node 102 may initiate a standardized nodal metronome signal, which is then broadcast to the client computer device 14 of the performer 12, and which plays according to the tempo of block B52. As used herein, "nodal" entails a standardized metronome signal for playing in the same manner on the client computer devices 14, e.g., with the same tempo or pace, which will nevertheless commence at different times on the various client computer devices 14 based on when a given performer 12 accesses the app and commences a recording.

Any of the parameters may change during recording of a piece, such as tempo, and thus the client computer device 14 is configured to adjust to such changes, for instance by adaptively varying or changing presentation, broadcast, or local playing of the backing track and/or the nodal metronome signal. The nodal metronome signal and/or the backing track may possibly be varied in real-time depending on the performance piece, or possibly changing in an ad-hoc or "on the fly" manner as needed. As with block B52, embodiments may be visualized in which the backing track and/or the nodal metronome signal is broadcasted or transmitted by one of the client computer devices 14 acting as a host device using functions residing thereon. The backing track and/or the nodal metronome signal may be based upon performance parameters, e.g., a time signature, tempo, and/or total length of the performance piece.

For implementations in which a nodal metronome signal is used, such a signal may be provided by a metronome device. Metronomes are typically configured to produce an audible number of clicks per minute, and thus serve as an underlying pulse to a performance. In the present method 50, the nodal metronome signal may entail such an audible signal. Alternatively, the nodal metronome signal may be a visual indication such as an animation or video display of a virtual metronome, and/or tactile feedback that the performer 12 can feel, e.g., as a wearable device coupled or integrated with the client computer device 14. In this manner, the performer 12 may better concentrate on performing without requiring the performer 12 to avert his or her eyes toward a display screen, e.g., 14D or 102D of FIG. 1, or without having to listen to an audible clicking sound.

For implementations in which a backing track is used, a backing track may include audio and/or video data. A backing track may be a recording of a single part or voice of the performance piece being performed, e.g., a piano part of the performance piece, a drum part of the performance piece, a soprano voice of the performance piece, etc. In other embodiments, the backing track may be a recording of multiple parts and/or voices of the performance piece being performed, e.g., the string section of the performance piece, all parts of the performance piece except the part currently being performed by the current performer, etc. In other embodiments, the backing track may be a recording of the full piece being performed, i.e., all parts and/or voices included. Alternative embodiments of the backing track include a conductor conducting the performance of the performance piece.

Continuing with the discussion of possible alternative embodiments of the present teachings, a first performer may record their performance of a performance piece and this recording of the first performer may be used as a backing track for a second performer to record their performance of the performance piece alongside. It could then be the case that the recording of the first performer and the second performer could be synchronized into a single backing track for a third performer to record alongside. In this way, backing tracks may be "stacked" as multiple performers record. The backing track and/or the nodal metronome signal, may play on a given client computer device 14 prior to the start of the recording of audio and/or video to provide the performer 12 with a preview.

In some embodiments, the backing track and/or the nodal metronome signal may play according to the input tempo and input time signature and the corresponding input locations in the piece of the tempos and time signatures. If the backing track and/or the nodal metronome signal use audio signaling, the distributed recording nodes 15 may have functionality to ensure that audio from the backing track function and/or the nodal metronome signal is not audible in the performance recording, e.g., through playing backing track and/or the nodal metronome signal audio through headphones and/or by filtering out the backing track and/or the nodal metronome signal audio content in the performance recording or virtual ensemble. Likewise, the distributed recording nodes 15 or central assembler node 102 may have functionality to silence undesirable vibrations or noise in the event tactile content or video content is used in the backing track and/or the nodal metronome signal.

Alternative embodiments may, at block B54, initiate the playing of the backing track and/or the nodal metronome signal. The backing track and/or the nodal metronome signal may be played through headphones for a performer 12 to follow along with and keep in tempo during their respective performance without the backing track and/or the nodal metronome signal being audible in the performance recording. The backing track may be used entirely instead of the nodal metronome, or alongside the nodal metronome during the recording of the performance recording.

Another alternative embodiment or type of backing track may use visual cues to display a musical score of the performance piece being performed for the performers 12 to follow along with and keep in tempo. In this embodiment, the musical score may be visually displayed on the display screen 14D of the client computing device 14, the display screen 102D of the central assembler node 102, or another display screen, such that the performers 12 can view the musical score while performing. In this embodiment, the musical score that is displayed may have a functionality to visually and dynamically cue the performers 12 to a specific musical note that should be played at each instant in time, such that the performers 12 can follow along with the visual cues and keep in tempo. The musical score with its dynamic visual cues of musical notes in this example could be displayed alongside audio from either the backing track and/or the nodal metronome signal simultaneously while the performer is recording the performance recording. The musical score of the piece being performed may visually appear, e.g., on the client computing device 14 during block B54, or it may visually appear prior to block B54. The dynamic visual cues of musical notes may begin during block B54.

Block B56 entails cueing a start of the performance piece of a given performer 12 indicated in the performance parameters, i.e., the performer 12 is "counted-in" to the performance. That is, either prior to or at the start of the backing track and/or nodal metronome signal playing for the performer 12 via the client computer device 14, the performer 12 is also alerted with an audible, visible, and/or tactile signal that the performance piece is about to begin. An exemplary embodiment of block B56 may include, for instance, displaying a timer and/or playing a beat or beeping sound that counts down to zero, with recording ultimately scheduled to start on the first measure/beat. The method 50 then proceeds to block B58.

Figure 5:
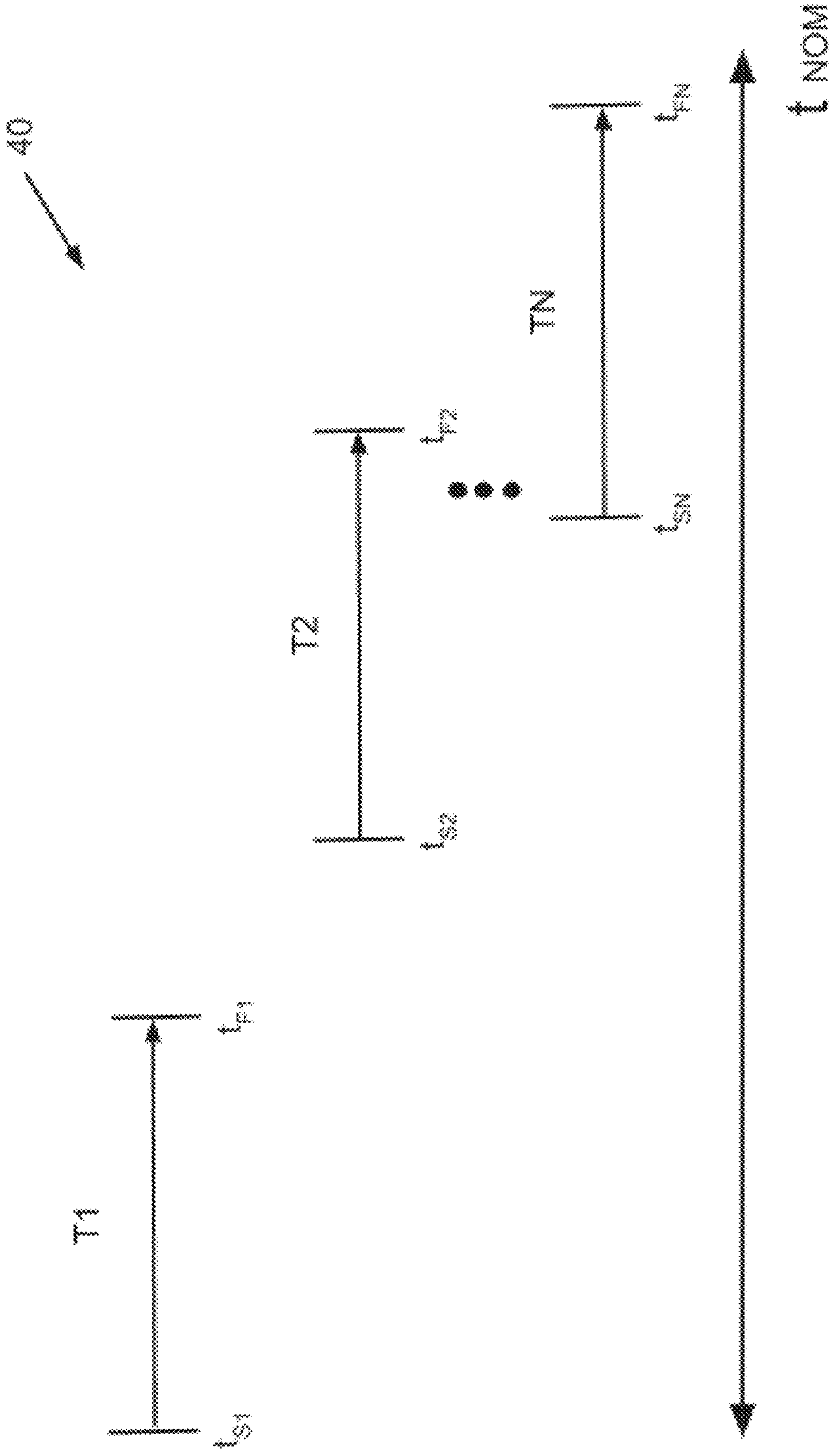
FIG. 5 is a nominal time plot of representative performances having a standardized performance time in accordance with the present disclosure.

Block B58 includes recording the performance piece via the client computer device 14. As part of block B58, a counter of a predetermined duration T may be initiated, with T being the time and/or number of measures of the performance piece. Referring briefly to the nominal time plot 40 of FIG. 5, in such an embodiment, each of the N performers 12 may perform a respective piece segment with a corresponding start time, e.g., $t_{s1}$, $t_{s2}$, . . . , $t_{sN}$. Likewise, each recording stops at a corresponding stop time $t_{f1}$, $t_{f2}$, . . . , $t_{fN}$. On a nominal time scale, the start and stop times of the performances will not coincide. That is, the start time $t_{s1}$ of a first performer 12 may be 12:00 pm while the start time $t_{s2}$ of a second performer 12 may be 3:30 pm, possibly on an entirely different day. Or, a single performer 12 may perform each recording at different times in embodiments in which the "ensemble" is a collection of recordings by the one performer 12. Regardless of temporal differences in the various recordings, each recording has the same predetermined length T, i.e., T1=T2=TN in the depicted simplified illustration of FIG. 5. The present method 50 thus ensures that every recording F(1), F(2), . . . , F(N) of FIGS. 1 and 2 has exactly the same length or number of measures.

In a possible alternative embodiment, some recordings may be of a different length than others. For instance, a performer 12 may rest during the end of a song, with a director possibly deciding not to include video of the resting performer 12 in the final virtual ensemble file 103. A performer 12 may only record while playing, with the recording node 15 and/or the central assembler node 102 making note of at which measures the performer 12 is playing before weaving the measure(s) into a final recording. Such an embodiment may be facilitated by machine learning, e.g., a program or artificial neural network identifying which performers 12 are not playing and automatically filtering the video data to highlight those performers 12 that are playing.

In performing blocks B56 and B58 of FIG. 3, each distributed recording node 15 may be configured to provide cues to a given performer 12 using visual, audio, haptic, and/or other suitable signaling. The cues may be used to indicate the start of audio and/or video recording at the start of the piece or piece section, or the entrance of a particular performer 12 after a predetermined rest. Additionally, such cues could be used to indicate to the performer 12 that the recording is ending or has ended (block B62). In certain embodiments, the distributed recording node 15 may output a visual, audio, and/or haptic signal, or any combination thereof, as a cue to the performer 12 or multiple performers 12. The method 50 proceeds to block B60 during recording of the performance.

Block B60 includes determining whether the performance time or number of measures of a given performance piece, i.e., an elapsed recording time $t_p$, equals the above-noted predetermined length T. Blocks B58 and B60 are repeated in a loop until $t_p$=T, after which the method 50 proceeds to block B62.

At block B62 of FIG. 3, the recording is stopped, and a digital output file is generated of the recording, e.g., F(1) in the illustrated example. Block B62 may include generating any suitable audio and/or visual file format as the digital output file, including but not limited to FLV, MP3, MP4, MKV, MOV, WMV, AVI, WAV, etc. The method 50 then proceeds to block B64.

Block B64 includes determining whether the performer 12 and/or another party has requested playback of the performance recorded in blocks B58-B62. For instance, upon finishing the recording, the performer 12 may be prompted with a message asking the performer 12 if playback is desired. As an example, playback functionality may be used by the performer 12 to identify video and/or audio imperfections in the previously-recorded performance recording. The performer 12 or a third party such as a director or choreographer may respond in the affirmative to such a prompt, in which case the method 50 proceeds to block B65. The method 50 proceeds in the alternative to block B66 when playback is not selected.

Block B65 includes executing playback of the recording, e.g., F(1) in this exemplary instance. The performer 12 and/or third party may then listen to and/or watch the performance via the client computer device 14 or host device. The method 50 then proceeds to block B66.

At block B66, the performer 12 may be prompted with a message asking the performer 12 whether re-recording of the recorded performance is desired. For example, after listening to the playback at block B65, the performer 12 may make a qualitative evaluation of the performance. The method 50 proceeds to block B68 when re-recording is not desired, with the method 50 repeating block B54 when re-recording is selected. Optionally, one may decide to re-record only certain times or lengths of the recording to save time in lieu of re-recording the entire piece, for instance when a given segment is a short solo performance during an extended song, in which case the re-recorded piece segment could be used in addition to or in combination with the originally recorded piece segment.

Block B68 entails performing optional down-sampling of the recorded performance F(1). Down-sampling, as will be understood by those of ordinary skill in the art, may be processing intensive. The option of performing this process at the level of the client computer device 14 is largely dependent upon the capabilities of the chipsets and other hardware capabilities thereof. While constantly evolving and gaining in processing power, mobile chipsets at present may be at a disadvantage relative to processing capabilities of a centralized desktop computer or server. Optional client computer device 14-level down-sampling is thus indicated in FIG. 3 by a dotted line format. As with blocks B64 and B66, block B68 may include displaying a prompt to the performer 12. The method 50 proceeds to block B69 when down sampling is requested, and to block B70 in the alternative.

At block B69, the client computer device 14 performs down-sampling on the recorded file F(1), e.g., compresses the recorded file F(1). Such a process is intended to conserve memory and signal processing resources. The method 50 proceeds to block B70 once local down-sampling is complete.

At block B70, the recording file F(1) is transmitted to the central assembler node 102 of FIG. 1, the functions of which may be hosted by one or more of the client computer devices 14 in the optional embodiment of FIG. 2. The distributed recorder 100, and the recording nodes 15 included in the distributed recorder, may have upload functionality to upload a previously-recorded performance recording to the network 101. The performance recordings may upload to the network 101 automatically in one embodiment. In another embodiment, the performance recordings are uploaded to the network 101 after input from the performer 12, allowing the performer 12 the opportunity to selectively review the performance recording prior to uploading. Block B70 may also include transmitting the virtual ensemble file 103 from the central assembler node 102 to one or more of the recording nodes 15 over the network connection 101.

Figure 4:
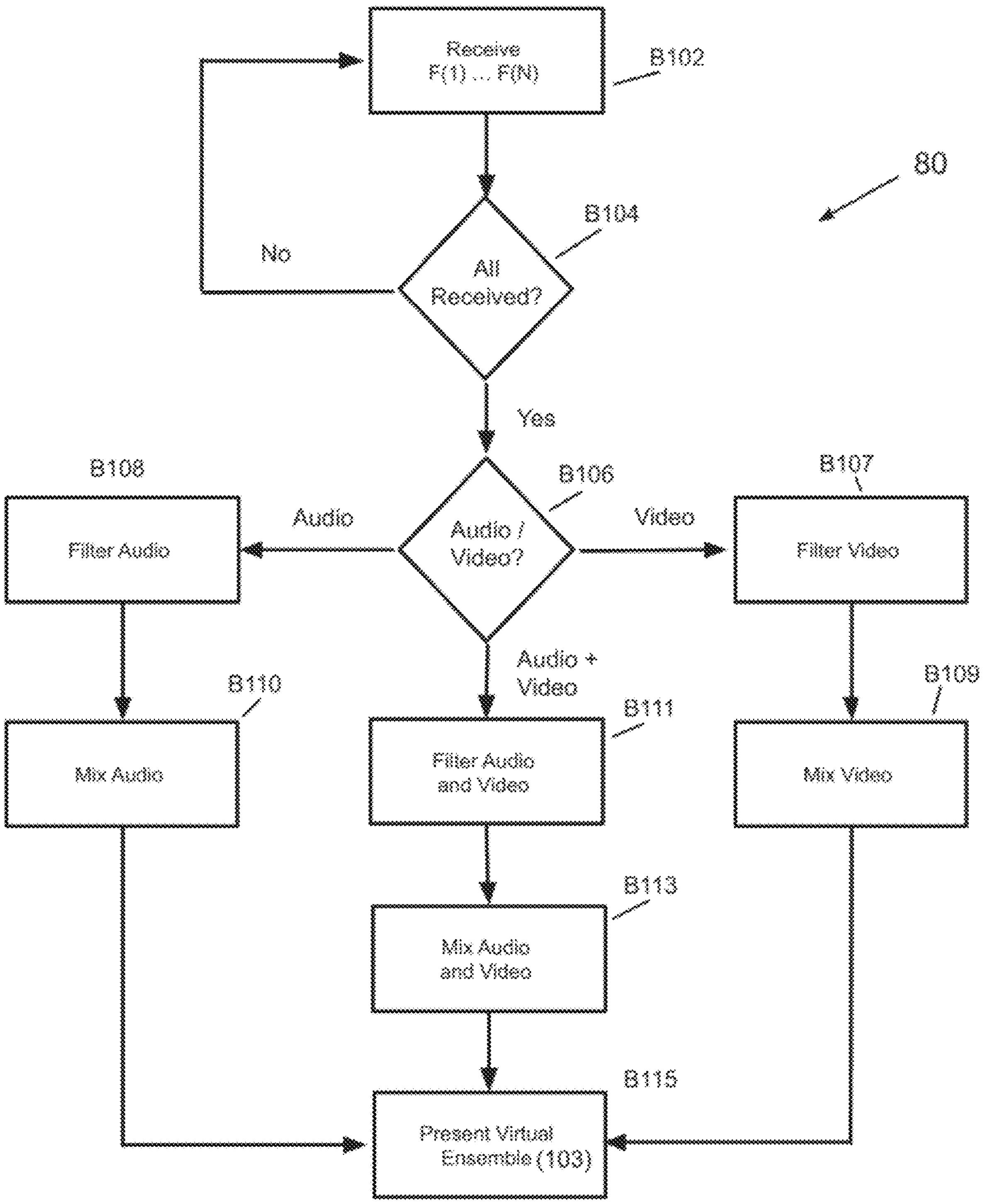

Referring to FIG. 4, a method 80 may be performed by the central assembler node 102 or a functional equivalent thereof, with the methods 50 and 80 possibly being performed together as a unitary method in some approaches.

In general, the method 80 may include receiving, at the central assembler node 102, a plurality of recorded performance files from one or more of the recording nodes 15, with the recorded performance files each corresponding to a performance piece. The recording nodes 15 are configured to generate a respective one of the recorded performance files concurrently with playing a backing track, a nodal metronome signal, etc. As described below, the recorded performance files respectively include audio data, visual data, or both, and have a standardized or standardizable performance length. The method 50 may also include generating the virtual ensemble file 103 at the central assembler node 102 as the digital output file, with the virtual ensemble file 103 including at least one of (i) mixed audio data which includes the audio data, or (ii) mixed video data which includes the video data. That is, a given virtual ensemble file, and thus the digital output file, may include audio data, video data, or both.

In a non-limiting exemplary implementation of the method 80, and beginning with block B102, the central assembler node 102 receives the various performance recordings F(1), . . . , F(N) from the distributed recording nodes 15, with the recordings generated by the recording nodes 15 concurrently with playing at least one of the backing track or the nodal metronome signal as noted above, with the central assembler node 102 possibly providing the backing track and/or the nodal metronome signal to the recording nodes 15 in certain implementations of the method 80. The performance recordings may be received by the central assembler node 102 via the network 101 of FIGS. 1 and 2. Alternatively, the individual performance recordings may be stored locally on the same platform as the central assembler node 102, in which case the performance recordings may be copied into the central assembler node 102, fetched by the central assembler node 102, and/or pointed to by the central assembler node 102.

As an optional part of block B102, the central assembler node 102 may receive additional inputs from the performers 12, for example muting, bounding and/or normalizing audio data for at least one performance recording for either part of or the entire performance recording, a feature to mute audio data, to delete audio and/or video data, or to alter the visual arrangement in terms of, e.g., size, aspect ratio, positioning, rotation, crop, exposure, and/or white balance of the visual data of selected performance recordings. Custom filters may likewise be used.

At block B104, the method 80 includes determining automatically or manually whether all of the expected recordings have been received. For instance, in a performance piece that requires 25 performers 12, i.e., N=25, block B104 may include determining whether all 25 performances have been received. If not, a prompt may be transmitted to the missing performers, e.g., as a text message, app notification, email, etc., with the method 80 possibly repeating blocks B102 and B104 in a loop for a predetermined or customizable time until all performances have been received. The method 80 then proceeds to block B106.

At block B106, the method 80 includes determining if the various recording include audio content only or visual content only, e.g., by evaluating the received file formats. The method 80 proceeds to block B107 when video content alone is present, and to block B108 when audio content alone is present. The method 80 proceeds in the alternative to block B111 when audio and/or visual content is present.

Blocks B107, B108, and B111 include filtering the video, audio, and/or audio/visual content of the various received files, respectively. The method 80 thereafter proceeds to block B109, B110, or B113 from respective blocks B109, B110, and B113. As appreciated by those of ordinary skill in the art, filtering may include passing the audio and/or visual each of the recorded performances through digital signal processing code or computer software in order to change the content of the signal. For audio filtering at block B108 or B111, this may include removing or attenuating specific frequencies or harmonics, e.g., using high-pass filters, low-pass filters, band-pass filters, amplifiers, etc. For video filtering at block B107 or B111, filtering may include adjusting brightness, color, contrast, etc. As noted above, normalization and balancing may be performed to ensure that each performance can be viewed and/or heard at an intended level.

Blocks B109, B110, and B113 include mixing the filtered audio, video, and audio/video content from blocks B107, B108, and B111, respectively. Mixing entails a purposeful blending together of the various recorded performances or "tracks" into a cohesive unit. Example approaches include equalization, i.e., the process of manipulating frequency content and/or changing the balance of different frequency components in an audio signal. Mixing may also include normalizing and balancing the spectral content of the various recordings, synchronizing frame rates for video or sample rates for audio, compressing or down-sampling the performance file(s) or related signals, adding reverberation or background effects, etc. Such processes may be performed to a preprogrammed or default level by the central assembler node 102 in some embodiments, with a user possibly provided with access to the central assembler node 102 to adjust the mixing approach, or some function such as compressing and/or down-sampling may be performed by one or more of the recording nodes 15 prior to transmitting the recorded performance files to the central assembler node 102.

At block B115, the central assembler node 102 generates the virtual ensemble file 103 of FIGS. 1 and 2, and presents the virtual ensemble. Essentially, block B115 is an output step in which a digital output file, i.e., the virtual ensemble file 103 of FIGS. 1 and 2, is output and thus provided for playback on any suitably configured device. Optionally, the central assembler node 102 may have a one-click option to quickly create the virtual ensemble file 103. For example, the one-click option may be a single button that, when clicked by one of the performers 12 or a designated user, e.g., a conductor, band leader, director, or choreographer, will automatically pull all the performance recordings from a set location and compile them into the virtual ensemble file 103. Such a one-click option may assemble the virtual ensemble file 103 using a particular layout, with mixed audio data from the various performance recordings possibly overlaid with video data.

Figure 6:
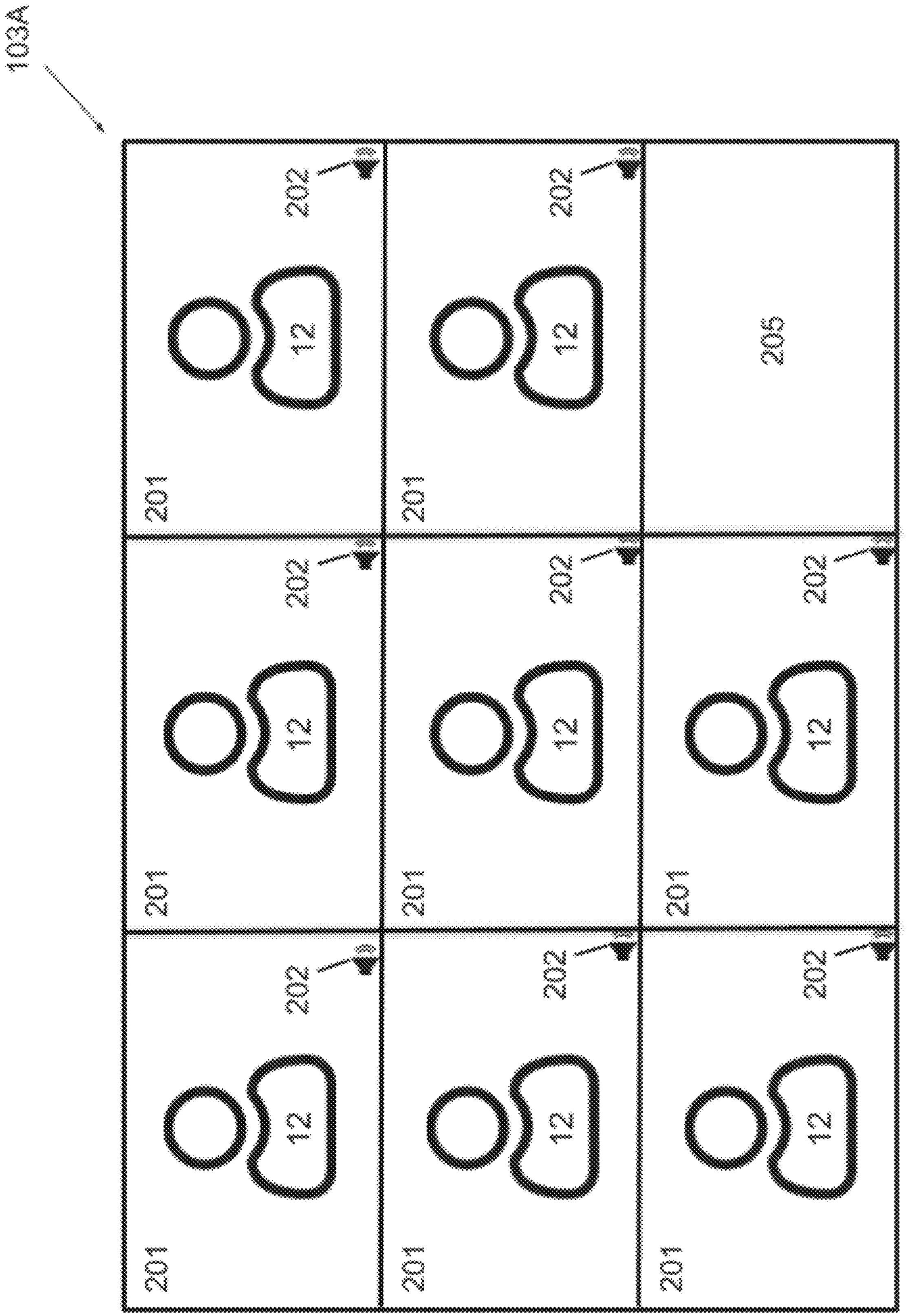
FIGS. 6 and 7 depict possible embodiments for presentation of a virtual ensemble constructed using the system of FIG. 1 or 2.
Figure 7:
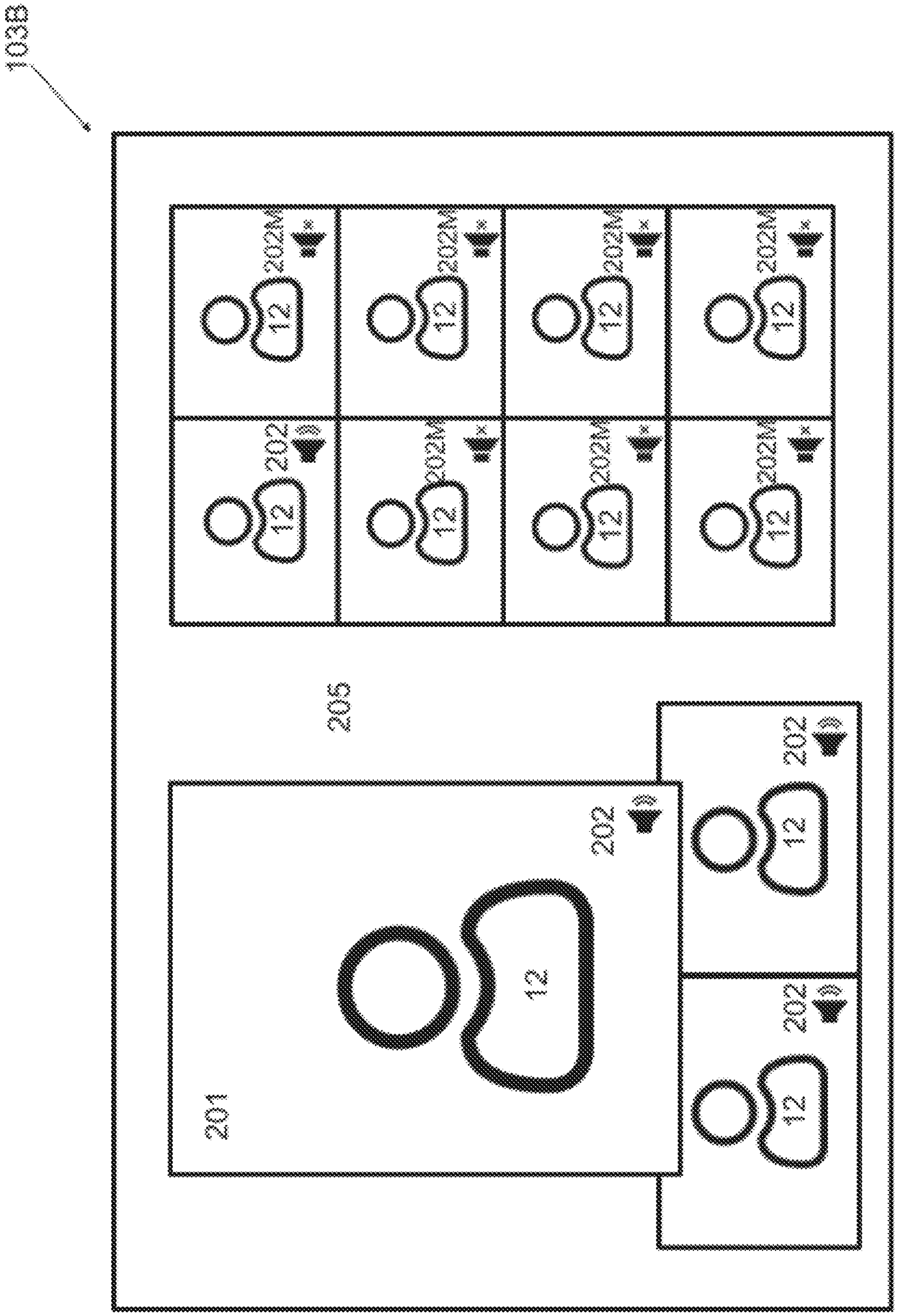

FIGS. 6 and 7 illustrate possible variations of the virtual ensemble file 103 shown in FIGS. 1 and 2. Within the scope of the disclosure, the virtual ensemble file 103 may be comprised of multiple (N) individual remote performance recordings 12(1), . . . , 12(N). Each recording may be of a different part of a performance piece, with the various recordings thereafter mixed into a virtual ensemble.

As shown in FIGS. 6 and 7, the virtual ensemble file 103A or 103B in different optional embodiments may have a video component that is possibly presented as a matrixed, gridded, or tiled arrangement of the performance recordings, whether fixed or overlapping. An audio component may be a mix of audio from the performance recordings, or the audio component may be a single audio track. The virtual ensemble files 103A and 103B may have the video data 201 and/or audio data 202 of the various performances synchronized with respect to each other and the particular piece being performed.

FIG. 6 shows the virtual ensemble file 103A organized in a grid layout, i.e., in columns and rows, with the number of equally-sized grid spaces being minimized for illustrative simplicity. The plurality of performance recordings 12 may have audio data 202 and video data 201. The audio data 202 may be mixed, as noted above with reference to FIG. 4. In some embodiments, a customizable background 205 may be used for the video data 201, e.g., an image, a video, a pattern, one or more colors, grayscale, black, white, etc.

FIG. 7 shows another possible layout for the virtual ensemble file 103B in which each performance recording has respective video data 201 arranged in a structure that is not a grid. The video data 201 may vary in size, shape, and/or overlap. FIG. 7 also shows an option in which at least one of the performance recordings has muted audio data 202M, with muting or normalizing possibly performed by the performer 12, another user of the system 10, the central assembler node 102, or as a manual filtering option. Thus, implementations of the present teachings may include muting or normalizing audio data, video data, or both for at least some of the recorded performance files described above.

While method 80 has been described above in terms of possible actions of the central assembler node 102, those skilled in the art will appreciate, in view of the foregoing disclosure, that embodiments may be practiced from the perspective of the recording nodes 15. By way of an example, a method for creating the virtual ensemble file 103 may include receiving the input signals (arrow 11) inclusive of the at least one of the backing track or the nodal metronome signal at one or more of the recording nodes 15, and then generating, at the one or more recording nodes 15, a plurality of recorded performance files concurrently with playing the at least one of the backing track or the nodal metronome signal at the one or more recording nodes 15. As with the earlier-described embodiments, the plurality of recorded performance files corresponds to a given performance piece, and the recorded performance files have a standardized or standardizable performance length, with each recorded performance file of the plurality of recorded performance respectively includes at least one of audio data or visual data. Such an implementation of the method includes transmitting, from the one or more recording nodes 15, the plurality of recorded performance files to the central assembler node 102, e.g., via the network connection 101. The central assembler node 102 in turn is configured to generate the virtual ensemble file 103 as a digital output file. The virtual ensemble file 103 includes at least one of (i) mixed audio data which includes the audio data, or (ii) mixed video data which includes the video data.

As will also be appreciated by those skilled in the art in view of the foregoing disclosure, the present teachings may be embodied as computer-readable media, i.e., a unitary computer-readable medium or multiple media. In such an embodiment, computer-readable instructions or code for creating the virtual ensemble file 103 are recorded or stored on the computer readable media. For instance, machine executable instructions and data may be stored in a non-transitory, tangible storage facility such as memory (M) of FIG. 1, and/or in hardware logic in an integrated circuit, etc. Such software/instructions may include application files, operating system software, code segments, engines, or combinations thereof. The memory (M) may include tangible, computer-readable storage medium or media, such as but not limited to read only memory (ROM), random access memory (RAM), magnetic tape and/or disks, optical disks such as a CD-ROM, CD-RW disc, or DVD disk, flash memory, EEPROM memory, etc. As understood in the art, tangible/non-transitory media are physical memory storage devices capable of being touched and handled by a human user. Other embodiments of the present teachings may include electronic signals or ephemeral versions of the described instructions, likewise executable by one or more processors to carry out one or more of the operations described herein, without limiting the computer-readable media embodiment of the present disclosure.

Execution of the instructions by a processor (P), for instance of the central processing unit (CPU) of one or more of the above-noted client devices 14, causes a first node, e.g., the collective set of recording nodes 15 described above, to generate a plurality of recorded performance files corresponding to a performance of a performance piece. This occurs concurrently with playing at least one of a backing track or a nodal metronome signal, e.g., by computer devices embodying the recording nodes 15. The recorded performance files have a standardized or standardizable performance length and include at least one of audio data or visual data, as described above. Execution of the instructions also causes a second node, e.g., a processor (P) and associated software of the central assembler node 102 possibly in the form of a server in communication with the client device(s) 14, to receive the plurality of the recorded performance files from the first node(s) 15, and, in response, to generate the virtual ensemble file 103 as a digital output file. Once again, the virtual ensemble file 103 includes at least one of (i) mixed audio data which includes the audio data, or (ii) mixed video data which includes the video data. Execution of the instructions may cause the first node to receive the at least one of the backing track or the nodal metronome signal via the network connection 101, and may optionally cause the second node to mute and/or normalize at least one of the audio data or the visual data for one or more of the plurality of the recorded performance files.

Execution of the instructions in some implementations causes at least one of the first node or the second node to display the virtual ensemble file 103 on a display screen 14D or 102D of the respective first node or second node.

As disclosed above with reference to FIGS. 1-7, the system 10 and accompanying methods 50 and 80 may be used to virtually unite performers who are unable to perform together in a live setting. The present approach departs from approaches that leave performers unable to standardize the start of each performance piece across all of the performance recordings. For example, using conventional recording techniques a given performer may start recording the performer's performance, e.g., by pushing a “record” button followed by a variable delay as the performer picks up an instrument and starts playing the piece. A standard start time is thus lacking across the wide range of performance recordings forming a given performance piece. Likewise, the present approach ensures that the performers do not drift away from a correct tempo using the nodal metronome signal, which can adjust tempo automatically during the performance of the piece. Such features enable the system 10 to properly synchronize all performance recordings during the assembly of the virtual ensemble file 103.

Likewise, the central assembler node 102 of FIGS. 1 and 2, unlike conventional video editing software, does not require manual alignment of a start of a performance piece for each of performance recording in order to account for varied start times. Operation of the central assembler node 102 does not require technical familiarity and knowledge of video editing applications. The present application is therefore intended to address these and other potential problems with coordination, recording, and assembly of a virtual ensemble.

As noted above, a given client computer device 14 may be in communication with a plurality of additional client computer devices 14, e.g., over the network connection 101. Thus, in some embodiments the client computer device 14 may be configured to receive additional recorded performance files from the additional client computer devices 14, and to function as the central assembler node 102. In such an embodiment, the client computer device 14 acts as the host device disclosed herein, and generates the virtual ensemble file 103 as a digital output file using the recorded performance files, including possibly filtering and mixing the additional recorded performance files into the virtual ensemble file 103. The various disclosed embodiments may thus encompass displaying the virtual ensemble file 103 on a display screen 14D of the client computer device 14 and the additional client computer devices 14 so that each performer 12, and perhaps a wider audience such as a crowd or instructor, can hear or view and thus evaluate the finished product.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

ADDITIONAL CONSIDERATIONS: Certain embodiments are described herein with reference to the various Figures as including logical and/or hardware based nodes. The term "node" as used herein may constitute software (e.g., code embodied on a non-transitory, computer/machine-readable medium) and/or hardware as specified. In hardware, the nodes are tangible units capable of performing described operations, and may be configured or arranged in a certain manner. In exemplary embodiments, one or more computer systems (e.g., a standalone, client or server computer system) and/or one or more hardware nodes of a computer system (e.g., a processor or a group of processors) may be configured by software (e.g., an application or application portion) as a hardware node that operates to perform certain operations as described herein.

In various embodiments, a hardware node may be implemented mechanically, electronically, or any suitable combination thereof. For example, a hardware node may comprise dedicated circuitry or logic that is permanently configured (e.g., as a special-purpose processor, such as a field programmable gate array (FPGA) or an application-specific integrated circuit (ASIC)) to perform certain operations. A hardware node may also comprise programmable logic or circuitry (e.g., as encompassed within a general-purpose processor or other programmable processor) that is temporarily configured by software to perform certain operations. It will be appreciated that the decision to implement a hardware node mechanically, in dedicated and permanently configured circuitry, or in temporarily configured circuitry (e.g., configured by software) may be driven by cost and time considerations.

Accordingly, the term "hardware node" encompasses a tangible entity, be that an entity that is physically constructed, permanently configured (e.g., hardwired), or temporarily configured (e.g., programmed) to operate in a certain manner or to perform certain operations described herein. Considering embodiments in which hardware nodes are temporarily configured (e.g., programmed), each of the hardware nodes need not be configured or instantiated at any one instance in time. For example, where the hardware node comprises a general-purpose processor configured using software, the general-purpose processor may be configured as respective different hardware nodes at different times. Software may accordingly configure a processor, for example, to constitute a particular hardware node at one instance of time and to constitute a different hardware node at a different instance of time.

Moreover, hardware nodes may provide information to, and receive information from, other hardware nodes. Accordingly, the described hardware nodes may be regarded as being communicatively coupled. Where multiple of such hardware nodes exist contemporaneously, communications may be achieved through signal transmission (e.g., over appropriate circuits and buses) that connect the hardware nodes. In embodiments in which multiple hardware nodes are configured or instantiated at different times, communications between such hardware nodes may be achieved, for example, through the storage and retrieval of information in memory structures to which the multiple hardware nodes have access. For example, one hardware node may perform an operation and store the output of that operation in a memory device to which it is communicatively coupled. A further hardware node may then, at a later time, access the memory device to retrieve and process the stored output. Hardware nodes may also initiate communications with input or output devices, and may operate on a resource (e.g., a collection of information).

Additionally, various operations of representative methods as described herein may be performed, at least partially, by one or more processors that are temporarily configured (e.g., by software) or permanently configured to perform the relevant operations. Exemplary processors (P) for this purpose are depicted in FIG. 1. Whether temporarily or permanently configured, such processors may constitute processor-implemented nodes that operate to perform one or more operations or functions. The nodes referred to herein may, in some example embodiments, comprise processor-implemented nodes. Similarly, the methods described herein may be at least partially processor-implemented. For example, at least some of the operations of a method may be performed by one or more processors or processor-implemented hardware nodes. The performance of certain of the operations may be distributed among the one or more processors, not only residing within a single machine, but deployed across a number of machines. In some embodiments, the processor or processors may be located in a single location, such as within a home environment, an office environment, or as a server farm, while in other embodiments the processors may be distributed across a number of locations. The processor(s) or processor-implemented nodes may be distributed across a number of geographic locations.

Unless specifically stated otherwise, discussions herein using words such as "processing," "computing," "determining," "presenting," "displaying," "generating," "receiving," "transmitting," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. As used herein, any reference to "one embodiment," "an embodiment," or the like means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Similarly, unless expressly stated to the contrary, "and/or" also refers to an inclusive or. For example, a condition A and/or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

In addition, use of the "a" or "an" are employed to describe elements and components of the embodiments herein. This is done merely for convenience and to give a general sense of the description. This description, and the claims that follow, should be read to include one or at least one and the singular also includes the plural unless expressly started or it is obvious that it is meant otherwise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

What is claimed is:

1. A method for creating a virtual ensemble file, comprising:

receiving, at a central assembler node, a plurality of recorded performance files from a plurality of recording nodes, the plurality of recorded performance files collectively corresponding to a performance piece performed by a plurality of performers, wherein each recording node of the plurality of recording nodes are configured to:

(a) receive, from the central assembler node, one or more performance parameters that include at least one of a time signature of the performance piece, a tempo of the performance piece, or a total length of the performance piece, (b) configure a metronome based on the one or more performance parameters, and (c) at least after configuring the metronome based on the one or more performance parameters at (b), record audio data and visual data for a recorded performance file of the plurality of recorded performance files concurrently with playing, via the metronome, a nodal metronome signal that is audible to a performer of the plurality of performers, wherein the plurality of recorded performance files collectively has each have a standardized or standardizable performance length with respect to one another, and wherein at least two recording nodes of the plurality of recording nodes are configured to perform operation (c) at different times from each other; and generating, at the central assembler node, the virtual ensemble file as a digital output file, wherein the virtual ensemble file includes (i) mixed audio data that includes the audio data for each of the plurality of recorded performance files, and (ii) mixed video data that includes, tiled over an array of video tiles, the video data for each the plurality of recorded performance files.

2. The method of claim 1, wherein each recording node of the plurality of recording nodes are further configured to vary the nodal metronome signal of the metronome responsive to receiving, from the central assembler node, a variation to the one or more performance parameters.

3. The method of claim 1, further comprising:

muting or normalizing at least one of the audio data or the visual data for at least some of the plurality of recorded performance files.

4. The method of claim 1, wherein each recording node of the plurality of recording nodes are further configured to pause performance of operation (c) in response to input from the performer of the plurality of performers.

5. The method of claim 1, wherein each recording node of the plurality of recording nodes are further configured to:

(d) at least after performing operation (c), re-recording new audio data and new visual data to overwrite at least part of the recorded performance file of the plurality of recorded performance files concurrently with re-playing, via the metronome, the nodal metronome signal that is audible to the performer of the plurality of performers.

6. The method of claim 1, wherein each recording node of the plurality of recording nodes are further configured to display a musical score corresponding to the performance piece concurrently with performance of operation (c).

7. The method of claim 1, wherein both the central assembler node and the plurality of recording nodes are hosted on the cloud.

8. A method for creating a virtual ensemble file, comprising:

(a) receiving, from a central assembler node at each of a plurality of recording nodes, input signals corresponding to one or more performance parameters that include at least one of a time signature of a performance piece, a tempo of the performance piece, or a total length of the performance piece;

(b) configuring, at each of the plurality of recording nodes, a metronome based on the one or more performance parameters;

(c) at least after configuring a metronome based on the one or more performance parameters at (b), recording, at each of the plurality of recording nodes, audio data and visual data for a recorded performance file of a plurality of recorded performance files concurrently with playing, at each of the plurality of recording nodes and via the metronome, a nodal metronome signal that is audible to a performer of a plurality of performers, wherein the plurality of recorded performance files collectively correspond to a performance piece performed by the plurality of performers, wherein the plurality of recorded performance files each has a standardized or standardizable performance length with respect to one another, and wherein at least two recording nodes of the plurality of recording nodes perform operation (c) at different times from each other; and (d) transmitting, from the plurality of recording nodes, the plurality of recorded performance files to the central assembler node configured to generate the virtual ensemble file as a digital output file, wherein the virtual ensemble file includes (i) mixed audio data that includes the audio data for each of the plurality of recorded performance files, and (ii) mixed video data that includes, tiled over an array of video tiles, the video data for each the plurality of recorded performance files.

9. The method of claim 8, further comprising:

varying the at the nodal metronome signal of the metronome responsive receiving, from the central assembler node, a variation to the one or more of the performance parameters.

10. The method of claim 8, further comprising:

receiving, from the central assembler node, a backing track; and playing, at a first set of the plurality of recording nodes and concurrently with operation (c), the backing track that is audible to the performer of the plurality of performers.

11. The method of claim 10, wherein the backing track played at the first set of the plurality of recording nodes includes an audio recording recorded by a second set of the plurality of recording nodes.

12. The method of claim 8, wherein the plurality of recorded performance files are transmitted from the plurality of recording nodes to the central assembler node via a network connection.

13. The method of claim 12, further comprising:

compressing or down-sampling the plurality of recorded performance files prior to transmitting the plurality of recorded performance files to the central assembler node.

14. One or more non-transitory computer-readable media, stored or recorded on which are instructions for creating a virtual ensemble file, wherein execution of the instructions causes:

a plurality of first nodes to;

(a) receive, from a second node, one or more performance parameters that include at least one of a time signature of a performance piece, a tempo of the performance piece, or a total length of the performance piece, (b) configure a metronome based on the one or more performance parameters, and (c) at least after configuring the metronome based on the one or more performance parameters at (b), record audio data and visual data for a recorded performance file of a plurality of recorded performance files concurrently with playing, via the metronome, a nodal metronome signal that is audible to a performer of a plurality of performers, wherein the plurality of recorded performance files collectively correspond to a performance piece performed by the plurality of performers, wherein each recorded performance file of the plurality of recorded performance files has a standardized or standardizable performance length, and wherein at least two of the plurality of first nodes perform operation (c) at different times from each other; and the second node to receive the plurality of the recorded performance files, and, in response, to generate the virtual ensemble file as a digital output file, wherein the virtual ensemble file includes (i) mixed audio data that includes the audio data for each of the plurality of recorded performance files, and (ii) mixed video data that includes, tiled over an array of video tiles, the video data for each the plurality of recorded performance files.

15. The one or more non-transitory computer-readable media of claim 14, wherein execution of the instructions causes the first node to receive the one or more performance parameters via a network connection.

16. The one or more non-transitory computer-readable media of claim 14, wherein execution of the instructions causes the plurality of first nodes to vary the at least one of the nodal metronome signal responsive to receiving, from the second node, a variation to the one or more performance parameters.

17. The one or more non-transitory computer-readable media of claim 14, wherein execution of the instructions causes the second node to at least one of mute or normalize at least one of the audio data or the visual data for one or more of the plurality of the recorded performance files.

18. The one or more non-transitory computer-readable media of claim 14, wherein execution of the instructions causes at least one of the plurality of first nodes or the second node to display the virtual ensemble file on a display screen of the first node or the second node.

19. The one or more non-transitory computer-readable media of claim 14, wherein the plurality of first nodes include at least one mobile device.

20. The one or more non-transitory computer-readable media of claim 19, wherein the second node is disposed on a server in remote communication with the at least one mobile device.

* * * * *